United States Patent
Shin

(10) Patent No.: US 8,877,395 B2
(45) Date of Patent: Nov. 4, 2014

(54) FUEL CELL SYSTEM AND OPERATION METHOD THEREOF

(75) Inventor: Woo-Cheol Shin, Suwon-si (KR)

(73) Assignee: Samsung SDI Co., Ltd (KR)

( * ) Notice: Subject to any disclaimer, the term of this patent is extended or adjusted under 35 U.S.C. 154(b) by 782 days.

(21) Appl. No.: 12/788,643

(22) Filed: May 27, 2010

(65) Prior Publication Data

US 2011/0117460 A1    May 19, 2011

(30) Foreign Application Priority Data

Nov. 18, 2009   (KR) .................. 10-2009-0111397

(51) Int. Cl.
*H01M 8/06* (2006.01)
*H01M 8/04* (2006.01)

(52) U.S. Cl.
CPC .............. *H01M 8/0618* (2013.01); *Y02E 60/50* (2013.01); *H01M 8/04022* (2013.01); *H01M 8/04074* (2013.01)
USPC .......................................... 429/423; 429/427

(58) Field of Classification Search
USPC ........................... 429/429, 423, 424, 425, 427
See application file for complete search history.

(56) References Cited

U.S. PATENT DOCUMENTS

| 7,550,214 B2 | 6/2009 | Matoba | |
| 2004/0250472 A1* | 12/2004 | Okada et al. | 48/214 A |
| 2005/0014040 A1* | 1/2005 | Kaye | 429/20 |
| 2006/0154121 A1 | 7/2006 | Bitoh | |
| 2006/0263658 A1* | 11/2006 | Yanagi et al. | 429/22 |
| 2010/0081021 A1 | 4/2010 | Taguchi et al. | |

FOREIGN PATENT DOCUMENTS

| JP | 06-097618 A | 4/1994 |
| JP | 2002-056873 A | 2/2002 |
| JP | 2006-196203 | 7/2006 |
| JP | 2007-194016 | 8/2007 |
| JP | 4383528 B2 | 10/2009 |
| KR | 10-2005-0043909 | 5/2005 |

OTHER PUBLICATIONS

KIPO Office Action (Korean only) in related Korean Application No. KR 10-2009-0111397 dated Aug. 19, 2011.
KIPO Office Action (Korean only) in related Korean Application No. KR 10-2009-0111397 dated Oct. 29, 2012.

* cited by examiner

*Primary Examiner* — Mark F Huff
*Assistant Examiner* — Monique Wills
(74) *Attorney, Agent, or Firm* — Knobbe, Martens, Olson & Bear LLP

(57) ABSTRACT

A fuel cell system capable of improving performance and stability of the system by using stack off-gas includes: a power generation unit that generates power through an electrochemical reaction of a first fuel and a first oxidant; a reforming unit that supplies the first fuel to the power generation unit; a heating unit that receives second fuel and a second oxidant, combusts the second fuel, and is thermal-conductively coupled with the reforming unit; and a connection unit that connects the heating unit with the power generation unit to be in fluid communication and supplies off-gas of the power generation unit to the heating unit. The off-gas is supplied to the heating unit in a pulse type.

7 Claims, 8 Drawing Sheets

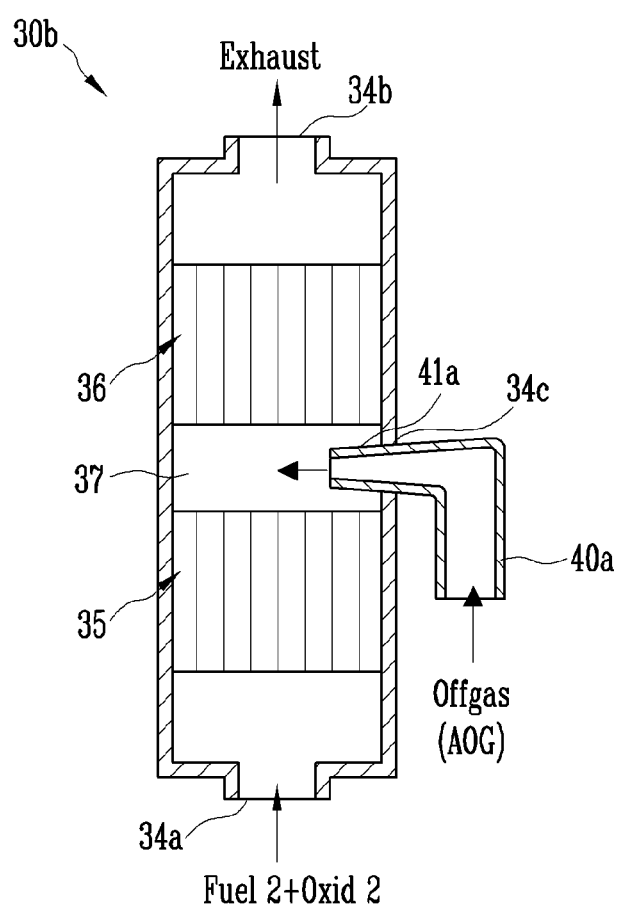

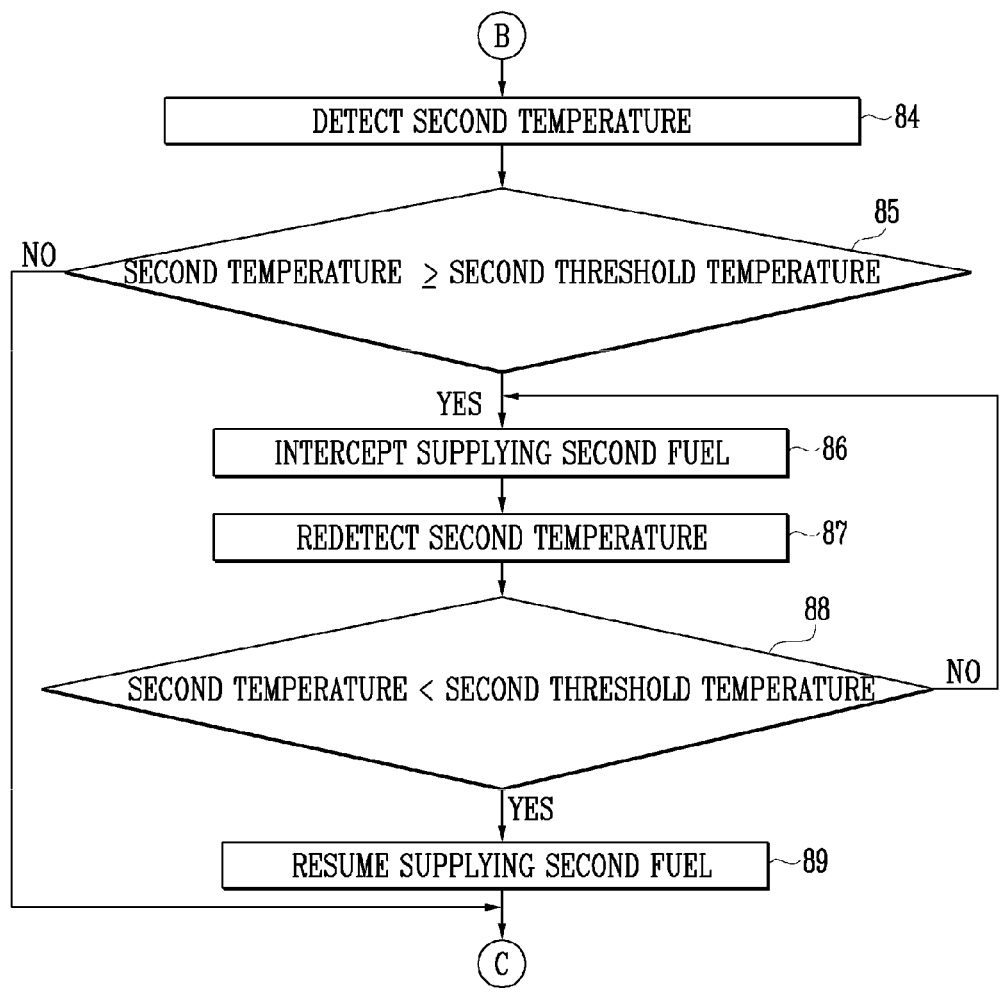

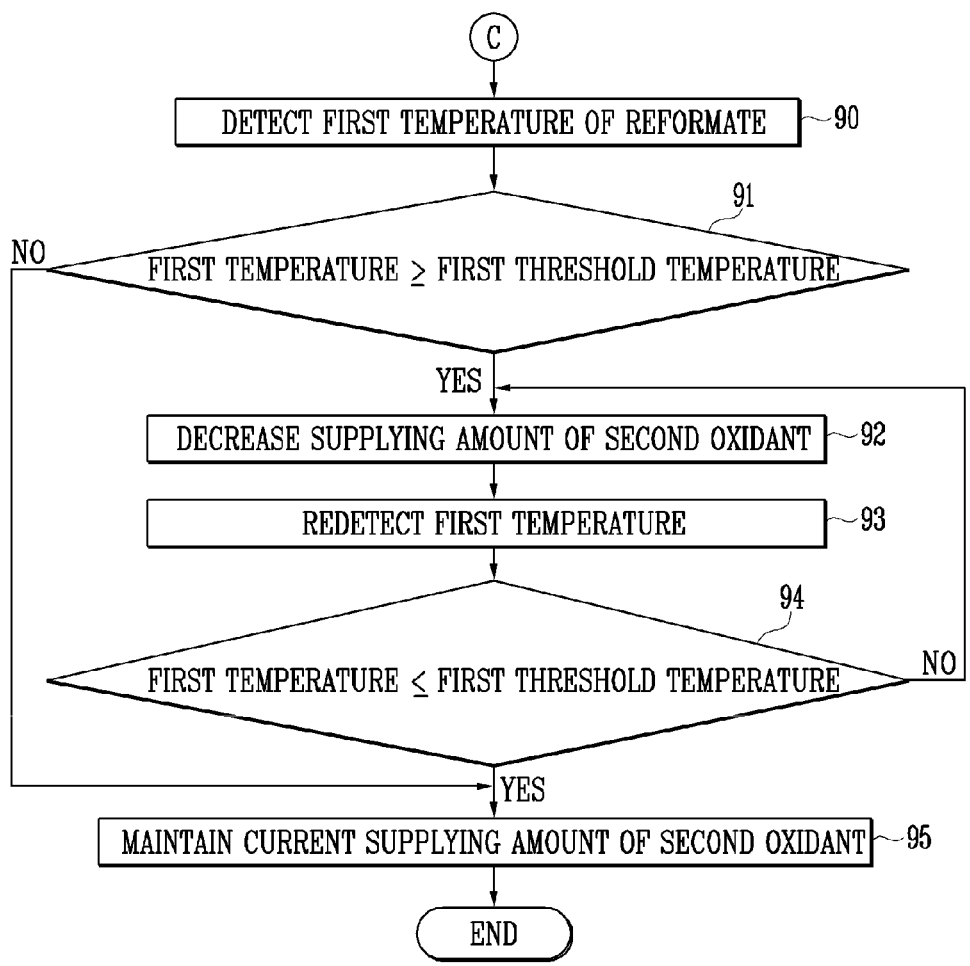

FUEL CELL SYSTEM AND OPERATION METHOD THEREOF

CROSS-REFERENCE TO RELATED APPLICATION

This application claims the benefit of Korean Patent Application No. 10-2009-0111397, filed Nov. 18, 2009 in the Korean Intellectual Property Office, the disclosure of which is incorporated herein by reference.

BACKGROUND

1. Field

An embodiment of the present invention relates to a fuel cell system capable of improving performance and stability by using stack off-gas and an operation method thereof.

2. Description of the Related Art

In this the modern society, there is an increasing concern about environment pollution. As such, there has been active progress in the development of alternative energy such as a fuel cell which is non-polluting and excellent in energy efficiency.

The fuel cell is a device that directly converts chemical energy into electric energy through electrochemical reaction of hydrogen and oxygen. The fuel cell is classified into a polyelectrolyte fuel cell, a solid oxide fuel cell, and a molten carbonate fuel cell in accordance with the electrolyte type. Hydrogen used in the polyelectrolyte fuel cell is typically acquired from a reformate reforming fuel such as methanol, liquid petroleum gas (LPG), gasoline, etc. This fuel is used due to various difficult problems caused by storing and transporting pure hydrogen. Therefore, in most of fuel cell systems using a steam reforming type reformate, a heating unit supplying heat required for steam reforming reaction is provided in the reformate.

SUMMARY

An embodiment of the present invention provides a fuel cell system capable of improving performance and stability of a heating unit and a reforming unit by supplying stack off-gas to the heating unit supplying heat to a reforming unit in a pulse type and an operation method thereof.

Further, another embodiment of the present invention provides a fuel cell system capable of improving efficiency and stability of a system by supplying stack off-gas to a heating unit supplying heat to a reforming unit in a pulse type and an operation method thereof.

According to an embodiment of the present invention, a fuel cell system includes: a power generation unit that generates power through electrochemical reaction of first fuel and a first oxidant; a reforming unit that supplies the first fuel to the power generation unit; a heating unit that receives second fuel and a second oxidant, combusts the second fuel, and is thermal-conductively coupled with the reforming unit; and a connection unit that connects the heating unit with the power generation unit to be in fluid communication and supplies off-gas of the power generation unit to the heating unit. Herein, the off-gas is supplied to the heating unit in a pulse type.

In an embodiment, the fuel cell system further includes a controller. The controller controls the temperature of the reforming unit by controlling the supplying amount of the second oxidant supplied to the heating unit in response to first temperature of the first fuel discharged from the reforming unit and controls the temperature of the heating unit by controlling the supplying amount of the second fuel supplied to the heating unit in response to second temperature of a fuel inlet of the heating unit.

In an embodiment, the controller includes a flow rate controller.

In an embodiment, the off-gas of a predetermined amount is additionally supplied to the heating unit in addition to supplying of the second fuel.

In an embodiment, supplying the second fuel is interrupted while the off-gas is supplied.

In an embodiment, the off-gas is directly supplied to the heating unit. One end of the connection unit through which the off-gas is discharged is spaced from the fuel inlet of the heating unit by a predetermined gap.

In an embodiment, the heating unit includes a first oxidation catalyst portion positioned adjacent to the fuel inlet and a second oxidation catalyst portion positioned spaced from the first oxidation catalyst portion by a predetermined gap. At this time, the one end of the connection unit through which the off-gas is discharged is connected between the first and second oxidation catalyst portions to be in fluid communication.

According to another embodiment of the present invention, an operation method of a fuel cell system including a power generation unit that generates power through electrochemical reaction of first fuel and a first oxidant, a reforming unit that supplies the first fuel to the power generation unit, a heating unit that receives second fuel and a second oxidant, combusts the second fuel, and is thermal-conductively coupled with the reforming unit, and a connection unit that connects the heating unit with the power generation unit to be in fluid communication and supplies off-gas of the power generation unit to the heating unit, includes: supplying the second fuel and the second oxidant to the heating unit; supplying fuel to the reforming unit; and supplying the off-gas to the heating unit in a pulse type.

In an embodiment, the fuel cell system further includes a controller. The operation method of a fuel cell system includes: controlling the temperature of the reforming unit by controlling the supplying amount of the second oxidant supplied to the heating unit in response to first temperature of reformate discharged from the reforming unit; and controlling the temperature of the heating unit by controlling the supplying amount of the second fuel supplied to the heating unit in response to second temperature of a fuel inlet of the heating unit.

In an embodiment, supplying the off-gas includes additionally supplying the off-gas of a predetermined amount to the heating unit while supplying the second fuel.

In an embodiment, supplying the off-gas includes interrupting supplying the second fuel while supplying the off-gas.

In an embodiment, the heating unit may include a first oxidation catalyst portion positioned adjacent to the fuel inlet and a second oxidation catalyst portion positioned spaced from the first oxidation catalyst portion by a predetermined gap. The operation method of the fuel cell system includes supplying the off-gas between the first and second oxidation catalyst portions.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 is a schematic cross-sectional view of a heating unit used in a fuel cell system of an embodiment.

FIGS. 6A to 6D are flowcharts of an operation method of a fuel cell system according to an embodiment.

DETAILED DESCRIPTION

Figure 1:
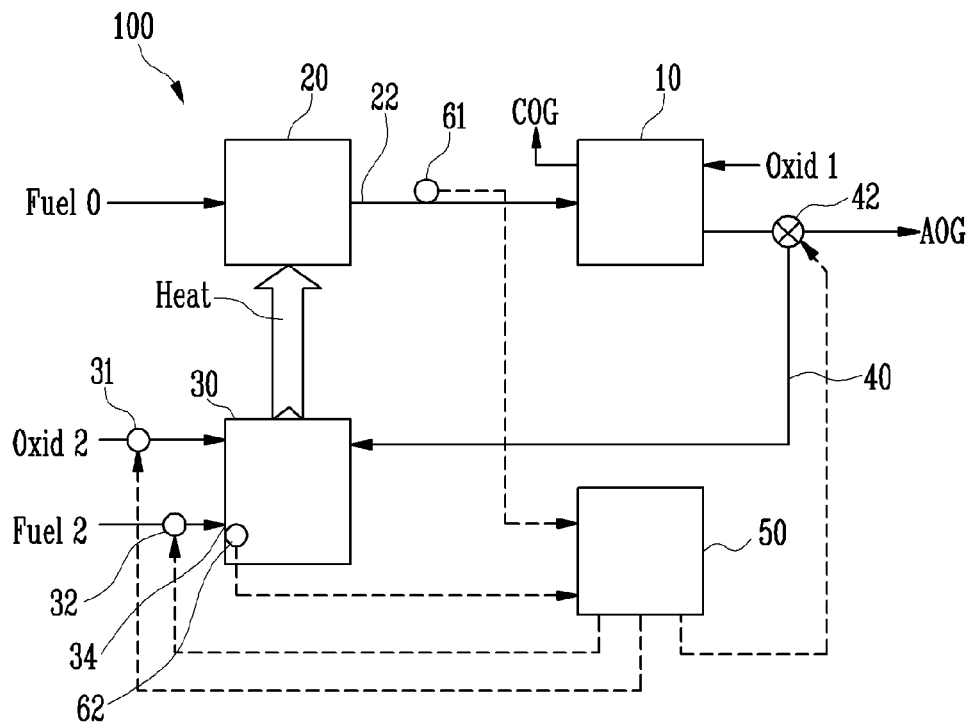
FIG. 1 is a schematic block diagram of a fuel cell system according to an embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

However, the described embodiments may be modified in various different ways, all without departing from the spirit or scope of the present invention. Also, in describing the embodiments, well-known functions or constructions will not be described in detail since they may unnecessarily obscure the understanding of the present invention. In addition, it will be appreciated that like reference numerals refer to like elements throughout even though they are shown in different figures. Further, when a first element is described as being coupled to a second element, the first element may be not only directly coupled to the second element but may also be indirectly coupled to the second element via a third element. Moreover, when a first layer is provided on a second layer, the first layer may be provided directly on the second layer or a third layer may be interposed therebetween. Additionally, in the figures, the thickness and sizes of each layer may be exaggerated for convenience of description and clarity and may be different from the actual thickness and size.

Figure 2:
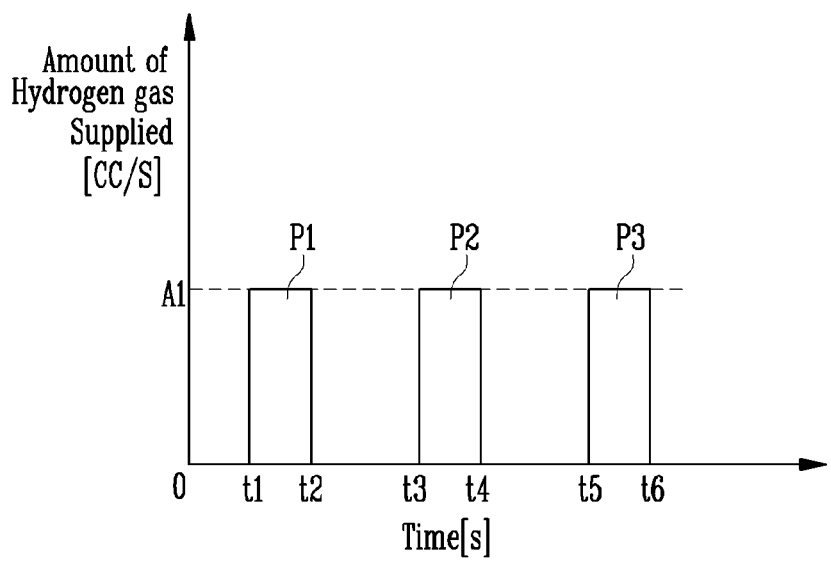
FIG. 2 is a schematic graph for describing supplying of off-gas in a fuel cell system of an embodiment.

FIG. 1 is a schematic block diagram of a fuel cell system 100 according to an embodiment. FIG. 2 is a schematic graph for describing supplying of off-gas in the fuel cell system 100. Referring to FIG. 1, the fuel cell system 100 includes a power generation unit 10, a reforming unit 20, a heating unit 30, and a connection unit 40.

The power generation unit 10 includes a fuel cell and generates electric energy by electromechanical reaction of a first fuel and a first oxidant (oxidant 1). Anode outlet gas (AOG) is discharged from an anode outlet of the power generation unit 10 and cathode outlet gas (COG) is discharged from a cathode outlet. The anode outlet gas (AOG) includes unreacted fuel, which includes hydrogen of a predetermined amount.

The reforming unit 20 generates reformate from a reforming fuel (Fuel 0). The reformate is supplied to the power generation unit 10 as the first fuel. The reformate may be supplied to the power generation unit 10 after the reformate is processed to have the content of carbon monoxide of 10 ppm or less in an additional WGS device and a PROX device. The reforming unit 20 may be implemented by methods such as steam catalyst reforming, partial oxidation reaction and/or autothermal reforming. Methanol, liquid petroleum gas (LPG), gasoline, etc. may be used as the fuel (Fuel 0).

The heating unit 30 is coupled to the reforming unit 20 to supply heat to the reforming unit 20. The heating unit 30 may be implemented by a burner or an oxidation catalyst combustor. The heating unit 30 receives a second fuel (Fuel 2) and a second oxidant (Oxidant 2) and combusts the second fuel (Fuel 2) to generate heat used by the reforming unit 20.

The connection unit 40 connects the heating unit 30 with the power generation unit 10 to be in fluid communication. The connection unit 40 is provided to supply off-gas discharged from an anode of the power generation unit 40 (AOG) to the heating unit 30.

An off-gas control valve 42 is connected to the connection unit 40. The off-gas control valve 42 may be provided around the anode outlet of the power generation unit 10 in the form of a 3-way valve, but the invention is not limited to a specific valve type. The off-gas control valve 42 operates, such that the off-gas (AOG) supplied to the heating unit 30 from the power generation unit 10 has pulse types P1, P2, and P3 as shown in FIG. 2. The pulse type indicates that the off-gas (AOG) of a predetermined amount is intermittently supplied at a predetermined time interval as shown in FIG. 2. It is understood that the supply amount of the off-gas (AOG) may be increased depending on the content of hydrogen in the off-gas (AOG) in order to intermittently supply hydrogen gas of a predetermined amount A1.

When the off-gas (AOG) is supplied to the heating unit 30 in the pulse type, it is possible to prevent backfire in the heating unit 30. In other words, the off-gas (AOG) contains a large amount of hydrogen. Since the hydrogen is very short in quenching distance and very fast in diffusion rate, when the off-gas (AOG) is supplied to the burner or the oxidation catalyst combustor of the heating unit 30, the backfire is easily generated. However, when the off-gas (AOG) is supplied to the heating unit 30 in the pulse type, a mixing ratio of combustion fuel acquired by mixing the second fuel (Fuel 2) and the off-gas (AOG) with the second oxidant (Oxidant 2) or a mixing ratio of the off-gas (AOG) and the second oxidant (Oxidant 2) deviates from a range in which the backfire is easily generated. Accordingly, when the off-gas (AOG) is supplied in the pulses, it is possible to prevent the backfire. However, it is understood that other mechanisms can be used to prevent backfire. For instance, the intermittent supply of the off-gas (AOG) can have pulses with a varying frequency and amount or with regular and consistent pulses as shown. Moreover, while shown as varying between 0 and A1, it is understood that the lower amount of the pulse need not be 0 as shown.

In a modified example of the embodiment, the supply of the second fuel (Fuel 2) to the heating unit 30 may be maintained or interrupted while the off-gas (AOG) is supplied. When the second fuel (Fuel 2) and the off-gas (AOG) are supplied at the same time, the off-gas (AOG) may be supplied to the heating unit 30 through a fuel inlet other than a fuel inlet of the second fuel (Fuel 2). When the supply of the second fuel (Fuel 2) is interrupted while the off-gas (AOG) is supplied, the off-gas (AOG) may be supplied to the same fuel inlet as the fuel inlet of the second fuel (Fuel 2).

Referring back to FIG. 1, and while not required in all aspects, the fuel cell system 100 includes a controller 50. The controller 50 controls the temperature of the reforming unit 20 by controlling the amount of the second oxidant (Oxidant 2) supplied to the heating unit 30 in response to first temperature of the first fuel (Fuel 1) discharged from the reforming unit 20. Further, the controller 50 controls the temperature of the heating unit 30 by controlling the amount of the second fuel (Fuel 2) supplied to the heating unit 30 in response to second temperature around a fuel inlet 34 of the heating unit 30. While not required in all aspects, the controller 50 can be implemented as one or more processors executing software read from a computer readable medium.

In the fuel cell system 100 of the shown embodiment, a first sensor 61 is provided adjacent to a reformate outlet of the reforming unit 20 in order to detect the first temperature for the first fuel (Fuel 1). A first valve 31 is provided on a supplying path of the second oxidant (Oxidant 2) in order to control the supplying amount of the second oxidant (Oxidant 2). Further, a second sensor 62 is provided adjacent to the fuel inlet 34 of the heating unit 30 in order to detect the second temperature and a second valve 32 is provided on a supplying path of the second fuel (Fuel 2) in order to control the amount of the second fuel (Fuel 2) supplied to the heating unit 30.

According to the embodiment, it is possible to improve the performances and efficiencies of the heating unit 30 and the reforming unit 20 while preventing the backfire from being generated in the heating unit 30 by adopting an operational logic for the heating unit 30 as well as supplying the off-gas (AOG) in the pulse type. However, it is understood that the sensors 61,62 and valves 31,32 can be otherwise located in other combinations to similarly optimize the heating unit 30 and the reforming unit 20

Figure 3:
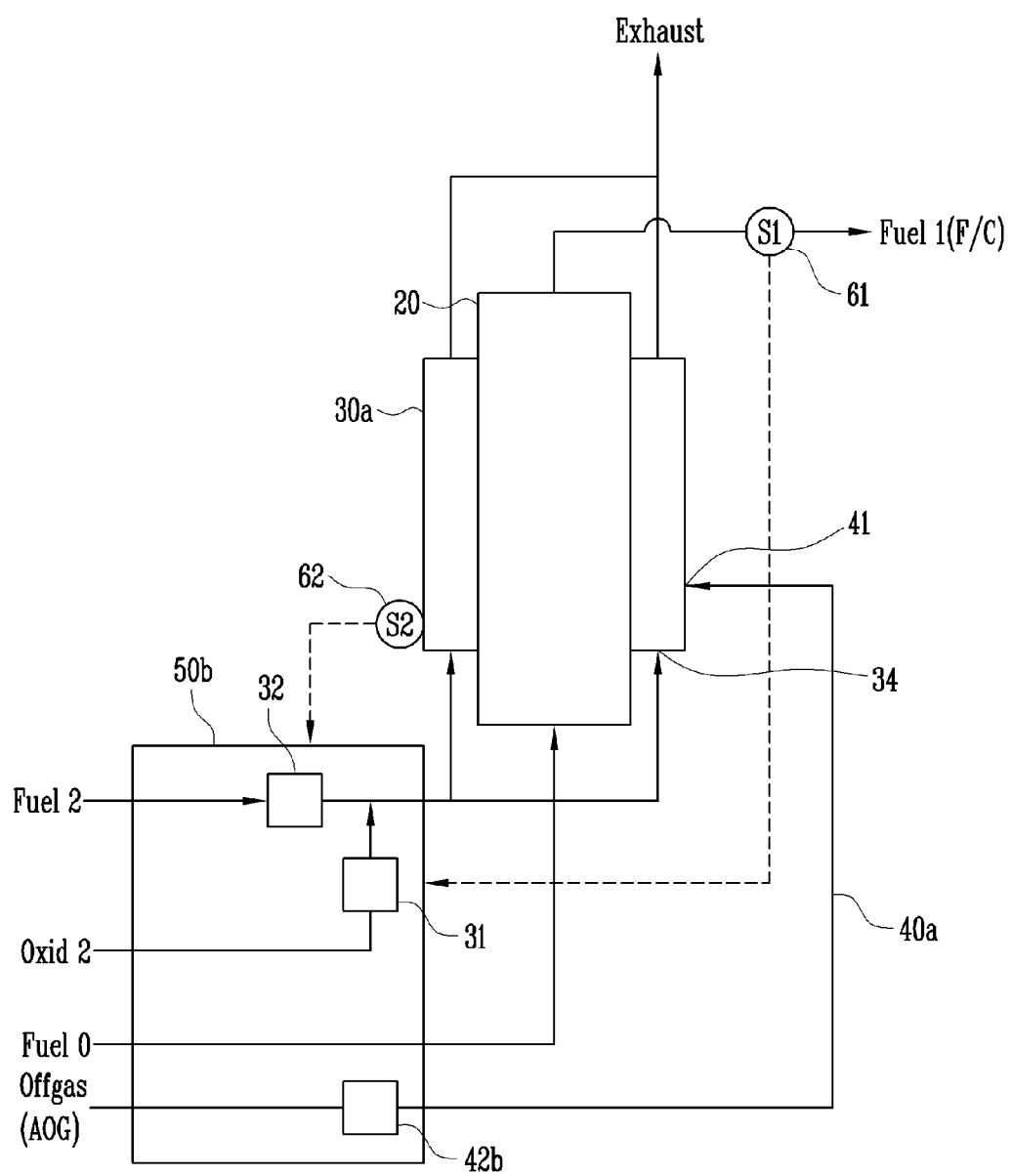
FIG. 3 is a schematic configuration diagram of a fuel cell system according to another embodiment.

FIG. 3 is a schematic configuration diagram illustrating a partial configuration of a fuel cell system according to another embodiment. Referring to FIG. 3, a controller 50b is used as a flow rate controller or a mass flow rate controller (MFC). The controller 50b includes the first valve 31 for controlling the flow rate of the second oxidant (Oxidant 2) and a second valve 32 for controlling the flow rate of the second fuel (Fuel 2).

A heating unit 30a is provided to surround a middle portion of the reforming unit 20. The reforming unit 20 and the heating unit 30a may have a dual-tube structure, but the invention is not limited thereto. Further, it is understood that the heating unit 30a can be disposed along the full length of the reforming unit 20 or at other portions in addition to or instead of the shown middle portion.

A connection unit 40a connects the heating unit 30a with a power generation unit (such as the power generation unit 10 shown in FIG. 1). A combustion gas control valve 42b is coupled to the connection unit 40a. The combustion gas control valve 42b may be provided in the controller 50b as shown, but can be disposed elsewhere.

In the shown embodiment, one end 41 of the connection unit 40a is spaced from the fuel inlet 34 of the heating unit 30a by a predetermined gap and is connected with the heating unit 30a to be in fluid communication. By this configuration, it is possible to prevent unstable combustion from being generated due to the mixing of the second fuel (Fuel 2) and the off-gas (AOG) at the fuel inlet 34 of the heating unit 30a.

The controller 50b receives temperature information of the reforming unit 20 and the heating unit 30a from the first sensor 61 and the second sensor 62. The first sensor 61 detects the first temperature of the reformate (Fuel 1) just discharged from the reforming unit 20. The second sensor 62 detects the second temperature around a fuel inlet of the heating unit 30a.

Figure 4:
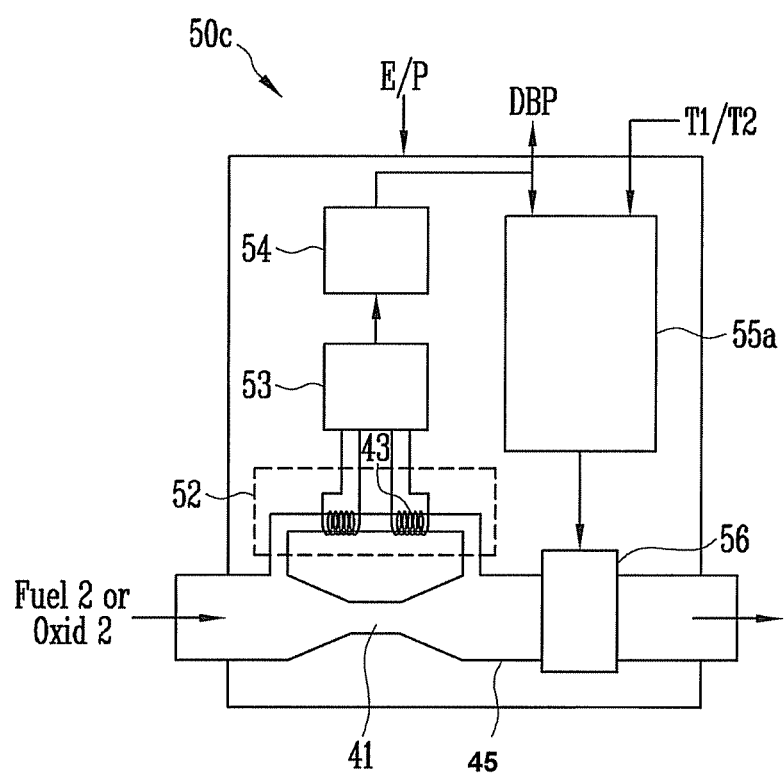
FIG. 4 is a schematic configuration diagram of a controller used in a fuel cell system of an embodiment.

FIG. 4 is a schematic configuration diagram of a controller 50c used in a fuel cell system of an embodiment. Referring to FIG. 4, the controller 50c is implemented as a flow rate controller. The controller 50c includes a flow rate sensor 52, a bridge circuit 53, an amplifier circuit 54, a comparison and control circuit 55a, and a valve 56. The flow rate controller 50c includes a housing having an inlet port and an outlet port connected to a pipe 45, but the invention is not limited thereto.

The flow rate sensor 52 is coupled to a bypass unit 43 provided in a middle part of a pipe 45 that transfers the second fuel (Fuel 2) or the second oxidant (Oxidant 2). That is, the flow rate sensor 52 is coupled to a sub-pipe 43 coupled to bypass the pipe 45 to detect the flow rate of the second fuel (Fuel 2) or the second oxidant (Oxidant 2) that passes through the pipe 45 through detection of the flow rate of the second fuel (Fuel 2) or the second oxidant (Oxidant 2) of a predetermined amount passing through the sub-pipe 43.

The bridge circuit 53 may include a Wheatstone bridge circuit used in various measuring instruments, but the invention is not limited thereto. The amplifier circuit 54 properly amplifies an output signal of the bridge circuit 53 and transfers the amplified output signal to the comparison and control circuit 55a. In the amplifier circuit 54, the signal transferred to the comparison and control circuit 55a may also be used as information for displaying the detection flow rate on an external device in aspects of the invention.

The comparison and control circuit 55a monitors the flow rate of the second fuel (Fuel 2) or the second oxidant (Oxidant 2) supplied to the heating unit through the pipe 45. Similarly and while not shown in FIG. 4, it is understood that the comparison and control circuit 55a may monitor the flow rate of the off-gas (AOG) transferred to the heating unit 30 from the power generation unit through the connection unit 40. Further, the comparison and control circuit 55a senses the first temperature T1 transferred from the first sensor (such as the first sensor 61 of FIG. 3) and/or the second temperature T2 transferred from the second sensor (such as the second sensor 62 of FIG. 3). The comparison and control circuit 55a compares the first temperature T1 or the second temperature T2 with a corresponding reference temperature.

In the embodiment, the reference temperature includes a first reference temperature representing a lower bound value of a desired temperature range for the reformate (Fuel 1) discharged from the reforming reaction unit (such as the reaction unit 20 of FIG. 3) and a first threshold temperature representing an upper bound of the desired temperature range for the reformate. Further, the reference temperature includes the lower bound value of the desired temperature range for the fuel inlet of the heating unit (such as the heating unit 30a of FIG. 3) and a second threshold temperature representing an upper bound value of the desired temperature range for the fuel inlet of the heating unit (such as the inlet 34 of FIG. 3).

The comparison and control circuit 55a transfers a control signal corresponding to the first temperature T1 or the second temperature T2 to the valve 56. The opening percentage of the valve 56 is automatically controlled by the control signal. The valve 56 may correspond to the first valve 31 or the second valve 32 shown in FIG. 3. Further, while shown in the context of the valves controlling the second fuel (Fuel 2) or second oxidant (Oxidant 2), the valve 56 may also correspond to the off-gas control valve 42b of FIG. 3 and similarly control the supply of off-gas (AOG).

The valve 56 is coupled to the pipe 45 to control the flow rate of the second fuel (Fuel 2) or the second oxidant (Oxidant 2) that flow rates on the pipe 45. Similarly, the valve 56 may control the off-gas (Fuel 0) that flows on the connection unit 40b in the pulse type.

The valve 56 includes a proportion control valve. For example, the valve 56 may include a solenoid valve including a solenoid having a magnetic core and a body having one or more orifices. However, the type of proportional control valve is not limited thereto FIG. 5 is a schematic cross-sectional view of a heating unit 30b used in a fuel cell system of an embodiment. Referring to FIG. 5, the heating unit 30b includes a first oxidation catalyst portion 35 positioned adjacent to a fuel inlet 34a in a predetermined housing, and a second oxidation catalyst portion 36 spaced from the first oxidation catalyst portion 35 by a predetermined gap at a downstream side in a direction in which the second fuel (Fuel 2) flows. The first and second oxidation catalyst portions 35 and 36 include the same kind or different kinds of oxidation catalysts. Further, the first and second oxidation catalyst portions 35 and 36 may include a predetermined substrate or a support supporting the oxidation catalyst.

One end 41a of the connection unit 40a is connected to the heating unit 30b to be in fluid communication so as to allow the off-gas (AOG) to flow into the heating unit 30b. Specifically, one end 41a of the connection unit 40a is inserted into the heating unit 30b into a space 37 between the first and second oxidation catalyst portions 35 and 36. When the one end 41a is in the space 37 to be in fluid communication, the off-gas (AOG) may be supplied independently from the second fuel (Fuel 2). Therefore, it is possible to prevent backfire from being generated due to mixing of the second fuel and the off-gas. While shown as being inserted into the space 37, it is understood that the end 41a need only connect to an off-gas inlet in the heating unit 30b and thus need not be inserted into the body of the heating unit 30b in order to supply the off-gas (AOG).

Further, when the off-gas (AOG) is supplied to the space 37 in pulses, unreacted second fuel (Fuel 2) passing through the first oxidation portion 35 may be fully combusted through the off-gas (AOG) which contains hydrogen having a higher flammability than the second fuel (Fuel 2). Accordingly, it is possible to increase combustion efficiency and substantially and fully remove carbon monoxide in exhaust gas discharged from an exhaust portion 34b of the heating unit 30b.

FIGS. 6A to 6D are flowcharts of an operation method of a fuel cell system according to an embodiment. In the embodiment, a case in which the off-gas is supplied only when the temperature of the heating unit is lower than first reference temperature as well as a normal operation is briefly described. Of course, the present invention is not limited to the configuration.

Referring to FIGS. 1 and 6A through 6D, fuel (Fuel 0) is supplied to the reforming unit 20 and the second fuel (Fuel 2) and the oxidant (Oxidant 2) are supplied to the heating unit 30 in order to actuate the system (operation 71). Next, after a predetermined starting time elapses, the first temperature of the reformate (Fuel 1) discharged from the reforming reaction unit 10 is detected (operation 72).

When the first temperature is lower than the first reference temperature, the supplying amount of the second oxidant (Oxidant 2) to the heating unit 30 is increased by a predetermined amount (operation 74). The first reference temperature may have a lower bound value within a proper temperature range of the reformate (Fuel 1). Meanwhile, when the first temperature is equal to or higher than the first reference temperature, predetermined operations 74 to 77 are omitted and thereafter, and the current amount of the second oxidant (Oxidant 2) to the heating unit 20 is maintained (operation 77).

After a predetermine time elapses, the first temperature is detected again (operation 75). When the re-detected first temperature is equal to or higher than the first reference temperature, the current supplying amount of the oxidant (Oxidant 2) is maintained (operation 77). When the first temperature is equal to ore lower than the first reference temperature, the supplying amount of the second oxidant (Oxidant 2) to the heating unit 30 is increased by a predetermined amount again (operation 74). In addition, subsequent operations 75 and 76 are performed again.

Figure 6A:
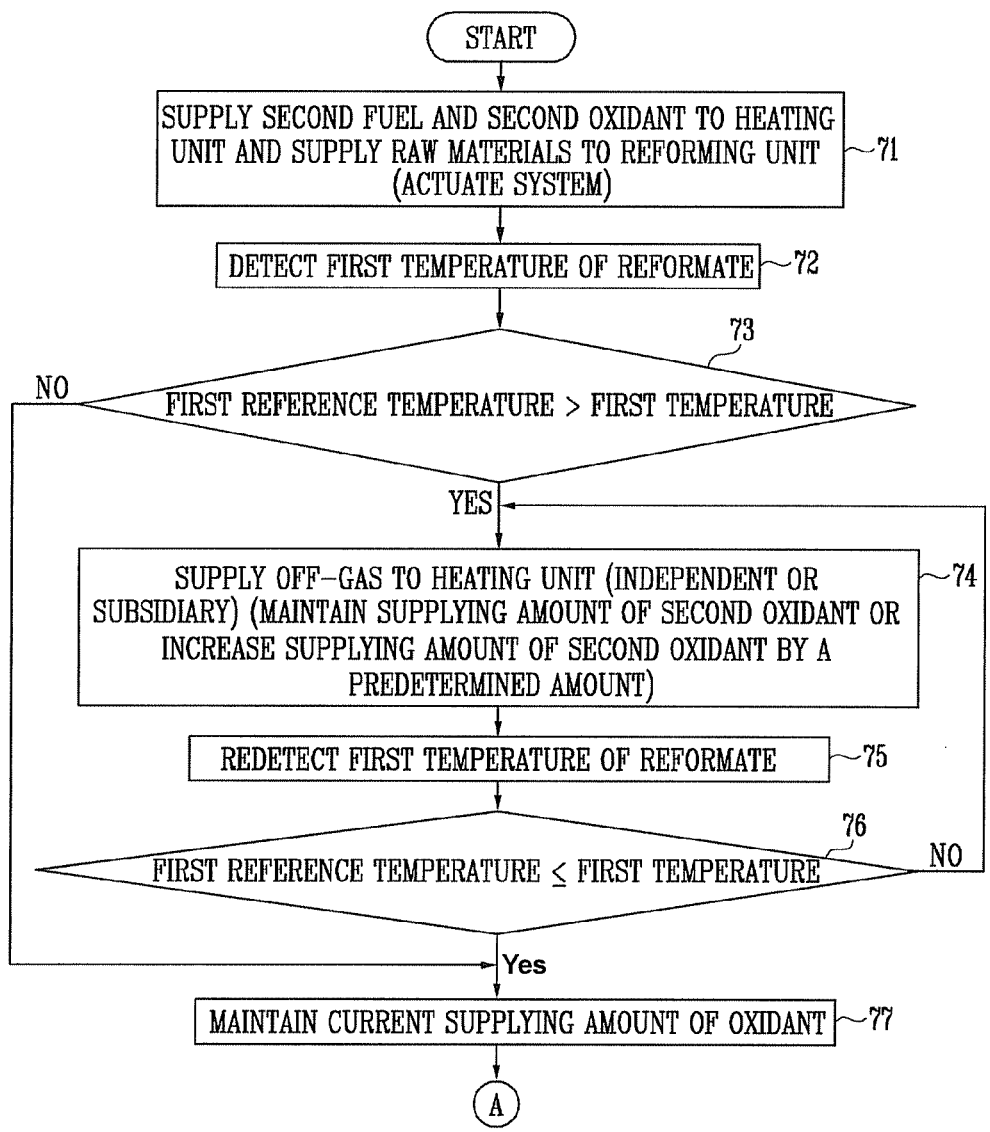
Figure 6B:
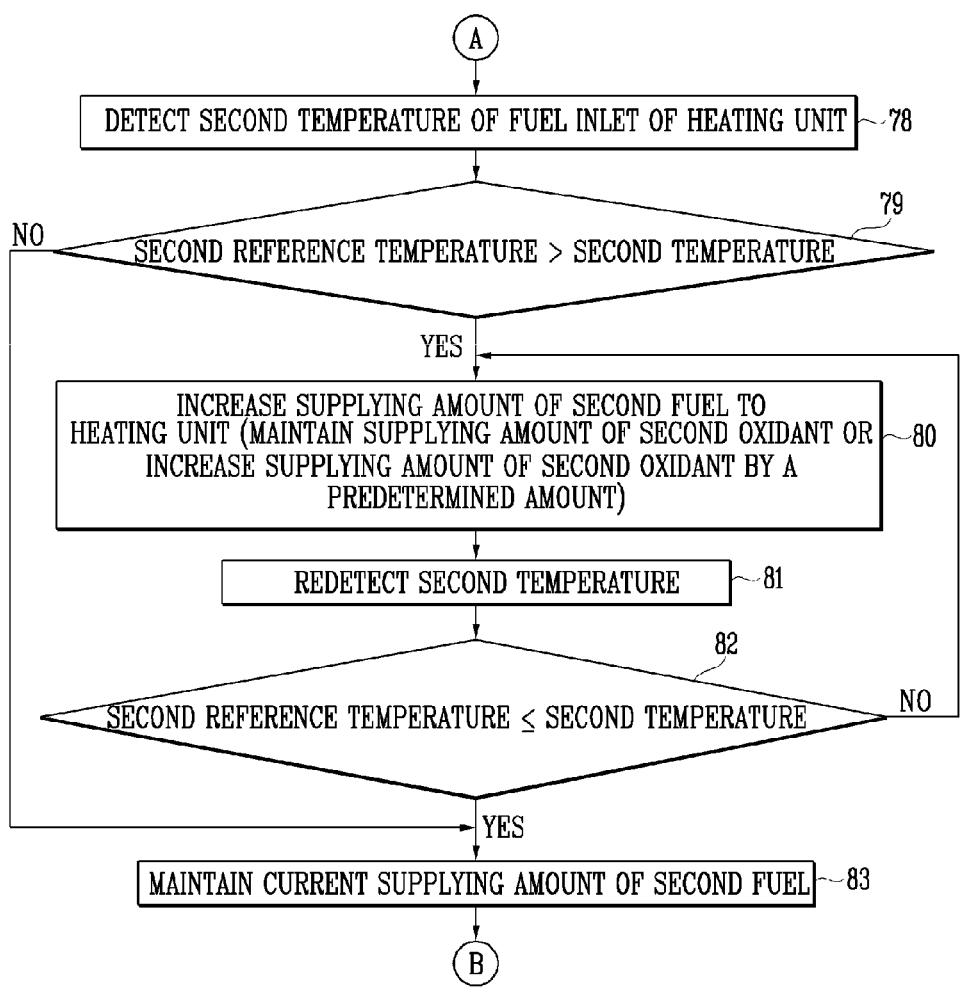

Meanwhile, as shown in FIG. 6B, the second temperature of the fuel inlet of the heating unit 30 is detected (operation 78). The second temperature may be detected after the above-mentioned operations 71 to 77 or simultaneously when the first temperature is detected.

When the second temperature is lower than the second reference temperature, the amount of the second fuel (Fuel 2) supplied to the heating unit 20 by a predetermined amount will be described as the second heating (operation 80). Herein, the second reference temperature may have a lower bound value within the proper temperature range of the heating unit 20.

In operation 80, while the amount of the second oxidant (Oxidant 2) supplied is basically maintained, only the amount of the second fuel (Fuel 2) supplied is increased by a predetermined amount. However, as necessary, for example, when the first temperature of the reformate (Fuel 1) is lower than the first reference temperature, the amount of the second oxidant (Oxidant 2) supplied may also be increased. Meanwhile, when the second temperature is equal to or higher than the second reference temperature, predetermined operations 80 to 82 are omitted and thereafter, and the current amount of the second fuel (Fuel 2) supplied to the heating unit 30 is maintained (operation 83).

After a predetermine time elapses, the second temperature is detected again (operation 81). In addition, when the second temperature is equal to or higher than the second reference temperature, the current amount of the second fuel (Fuel 2) supplied is maintained (operation 83). Meanwhile, when the second temperature is lower than the second reference temperature, the amount of the second fuel (Fuel 2) supplied to the heating unit 30 is increased by a predetermined amount again (operation 80). In addition, subsequent steps are performed again.

In an embodiment, the controller 50 continuously monitors the first temperature and the second temperature on the basis of the temperature information transferred from the first sensor 61 and the second sensor 62.

As shown in FIG. 6C, the second temperature of the heating unit 30 is detected (operation 84). In addition, the second temperature is compared with second threshold temperature (operation 85). Comparison of the second temperature and the second threshold temperature may be performed substantially at the same time as comparison of the second temperature and the second reference temperature.

The second threshold temperature may have a lower bound value within a proper temperature range of the heating unit 30. The second threshold temperature may be the temperature to cause damages to catalyst or components provided in the heating unit 30 when the heating unit 30 operates at the second threshold temperature or higher. That is, the second threshold temperature is the boundary temperature which is excessively high while being larger than an operation temperature range of the heating unit 30. Accordingly, the operation temperature of the heating unit 30 needs to be controlled not to increase up to temperature higher than the second threshold temperature.

When the second temperature is equal to or higher than the second threshold temperature, the supply of the second fuel (Fuel 2) to the heating unit 30 is interrupted (operation 86). At this time, supplying the second oxidant (Oxidant 2) and the off-gas (AOG) to the heating unit 30 are also interrupted. This is to protect the heating unit 30 from the excessive temperature. Meanwhile, when the second temperature is lower than the second threshold temperature, predetermined operations 86 to 89 are omitted and thereafter, the previous amount of the second fuel (Fuel 2) supplied to the heating unit 30 is just maintained.

After a predetermine time elapses, the second temperature of the heating unit 30 is detected again (operation 87). When the re-detected second temperature is lower than the second threshold temperature, the supply of the second fuel (Fuel 2) to the heating unit 30 is resumed (operation 89). Meanwhile, when the second temperature is equal to or higher than the second threshold temperature, the supply of the second fuel (Fuel 2) to the heating unit 30 is continuously interrupted (operation 86). In addition, subsequent operations 87 and 88 may be performed again.

As shown in FIG. 6D, the first temperature of the reformate (Fuel 1) is detected (operation 90). When the first temperature is equal to or higher than the first reference temperature (operation 91), the amount of the second oxidant (Oxidant 2) supplied to the heating unit 30 is decreased by a predetermined amount (operation 92). The first reference temperature may have an upper bound value within a proper temperature range of the reformate (Fuel 1). Herein, decreasing the supplying amount of the second oxidant (Oxidant 2) includes interrupting the supply of the second oxidant (Oxidant 2) for a predetermined time. Meanwhile, when the first temperature is lower than the first threshold temperature, predetermined operations 92 to 94 are omitted and thereafter, and the current amount of the second oxidant (Oxidant 2) supplied to the heating unit 30 is just maintained (operation 95).

After a predetermine time elapses, the first temperature is detected again (operation 93). When the re-detected first temperature is lower than the first threshold temperature (operation 94), the current amount of the second oxidant (Oxidant 2) being supplied is just maintained (operation 95). Meanwhile, when the first temperature is equal to or higher than the first threshold temperature (operation 94), the amount of the second oxidant (Oxidant 2) supplied to the heating unit 30 is again decreased by a predetermined amount (operation 92). In addition, subsequent operations 93 and 94 are performed again.

In the above-mentioned configuration, the off-gas (AOG) may be supplied to the heating unit 30 together with the second fuel (Fuel 2) or instead of the second fuel (Fuel 2) in the pulse type.

By the above-mentioned configuration, the first temperature of the reformate (Fuel 1) discharged from the reforming unit 20 may be controlled by controlling the amount of the second oxidant (Oxidant 2) supplied to the heating unit 30 while controlling the second temperature of the heating unit 30 by controlling the supplying amount of the second fuel (Fuel 2) and/or the off-gas (AOG) to the heating unit 30. Moreover, it is possible to rapidly and accurately prevent the heating unit 30 from operating at undesired excessively high temperatures. Further, the reformate (Fuel 1) can be generated substantially at constant temperature.

According to embodiments of the present invention, it is possible to prevent backfire in a heating unit by supplying stack off-gas to the heating unit supplying heat to a reforming unit in proper supplying position and proper flow rate.

Further, it is possible to stably and easily control the temperature of the heating unit by controlling the flow rate of the off-gas supplied to the heating unit and the flow rate of fuel (second fuel) in response to the temperature around a fuel inlet of the heating unit. Moreover, it is possible to stably and easily control the temperature of the reforming unit by controlling the flow rate of an oxidant (second oxidant) supplied to the heating unit in response to reformate (first fuel) just discharged from the reforming unit.

In addition, it is possible to improve stability and performance of the heating unit by controlling the supplying method of the off-gas and the supplying method of the fuel and the oxidant to the heating unit and maintain the temperature of the reformate discharged from the reforming unit very uniformly.

Also, it is possible to increase the overall efficiency of a fuel cell system and improve stability and reliability of the fuel cell system by securing long-time stable operation of the system.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell system, comprising:
   a power generation unit that generates power through an electrochemical reaction of a first fuel and a first oxidant and which produces an off-gas;
   a reforming unit that supplies the first fuel to the power generation unit;
   a heating unit that receives the off-gas, a second fuel and a second oxidant, combusts the second fuel and the off-gas, and is thermal-conductively coupled with the reforming unit and is part of the fuel cell;
   a connection unit that connects the heating unit with the power generation unit and supplies the off-gas of the power generation unit to the heating unit, wherein the off-gas is supplied to the heating unit in pulses;
   a controller programmed to control a temperature of the reforming unit by controlling the amount of the second oxidant supplied to the heating unit in response to a first temperature of the first fuel discharged from the reforming unit, and controls the temperature of the heating unit by controlling the amount of the second fuel supplied to the heating unit in response to a second temperature of a fuel inlet of the heating unit;
   a first sensor which detects the first temperature; and
   a second sensor which detects the second temperature,
   wherein a predetermined amount of the off-gas is supplied in one of the pulses to the heating unit while the second fuel is supplied to the heating unit,
   wherein the second fuel is not supplied to the heating unit while one of the pulses of the off-gas is supplied to the heating unit, and
   wherein the connection unit directly supplies the off-gas to the heating unit.

2. The fuel cell system of claim 1, wherein the controller includes a flow rate controller.

3. The fuel cell system of claim 1, wherein:
   the heating unit includes a fuel inlet through which the second fuel is supplied to the heating unit, and an off-gas inlet through which the off-gas is supplied to the heating unit from one end of the connection unit, and
   the off-gas inlet is separate from and spaced apart from the fuel inlet by a predetermined gap.

4. The fuel cell system of claim 3, wherein:
   the heating unit includes a first oxidation catalyst portion positioned adjacent to the fuel inlet and a second oxidation catalyst portion separated from the first oxidation catalyst portion by a predetermined gap, and
   the off-gas inlet is between the first and second oxidation catalyst portions such that the off-gas is discharged into the pre-determined gap between the first and second oxidation catalyst portions.

5. The fuel cell system of claim 1, comprising at least one valve which controls corresponding flow rates of the off-gas, the second fuel, and the second oxidant.

6. The fuel cell system of claim 1, comprising an off-gas control valve which controls a flow rate of the off-gas that flows through the connection unit.

7. The fuel cell system of claim 1, wherein the reforming unit includes a steam reforming reaction unit including a reforming catalyst.

* * * * *